United States Patent
Cote

(10) Patent No.: US 10,058,206 B2
(45) Date of Patent: Aug. 28, 2018

(54) APPARATUS AND METHOD OF TEMPERATURE-PRECISE CULINARY PROCESSES INCLUDING FOOD SAFETY VERIFICATION

(71) Applicant: Benjamin Cote, Edmonton (CA)

(72) Inventor: Benjamin Cote, Edmonton (CA)

(*) Notice: Subject to any disclaimer, the term of this patent is extended or adjusted under 35 U.S.C. 154(b) by 0 days.

(21) Appl. No.: 15/043,589

(22) Filed: Feb. 14, 2016

(65) Prior Publication Data

US 2017/0231417 A1   Aug. 17, 2017

(51) Int. Cl.
| | |
|---|---|
| A47J 27/00 | (2006.01) |
| A47J 27/10 | (2006.01) |
| A47J 27/62 | (2006.01) |
| G05D 23/19 | (2006.01) |

(52) U.S. Cl.
CPC ............... *A47J 27/10* (2013.01); *A47J 27/62* (2013.01); *G05D 23/1951* (2013.01)

(58) Field of Classification Search
CPC  A47J 31/002; A47J 31/52; A47J 31/56; A47J 27/62; G05D 23/1951
USPC ......... 99/280, 281, 282, 283, 325, 326, 328, 99/331, 333, 338
See application file for complete search history.

(56) References Cited

U.S. PATENT DOCUMENTS

| | | | | |
|---|---|---|---|---|
| 2015/0064314 A1* | 3/2015 | Manuel | ................... | A47J 36/32 426/231 |
| 2015/0074237 A1* | 3/2015 | Unagami | ............... | G06Q 99/00 709/219 |
| 2015/0213009 A1* | 7/2015 | Nonaka | ................ | G06F 19/3475 434/127 |
| 2016/0106133 A1* | 4/2016 | Schmitz | .................. | A23L 13/76 426/231 |
| 2016/0198885 A1* | 7/2016 | Logan | ..................... | A47J 27/62 99/325 |

FOREIGN PATENT DOCUMENTS

| | | |
|---|---|---|
| WO | WO2001064446 A1 | 5/2001 |
| WO | WO2011031306 A3 | 9/2010 |
| WO | WO2013130798 A1 | 2/2013 |
| WO | WO2014019018 A1 | 7/2013 |

* cited by examiner

*Primary Examiner* — Reginald L Alexander

(57) ABSTRACT

An apparatus and method for control of temperature-precise culinary processes with real-time verification of food safety and pathogen destruction. The apparatus and method utilizes software process control for monitoring and recording input temperature sensors, controlling active relays for adjusting temperature according to set programmable recipes. A connector kit (local or in the cloud) or gateway module receives real time data from the sensors and relays, and enables communication of real time data with client applications. An automatic process interface ("API") and a communication channel ("websocket") enable the connector kit (local or in the cloud), mobile applications, a website and cloud to share data and instructions. The API also stores data for authentication of client applications communicating that information via the connector kit (local or in the cloud) or gateway module enabling execution of client applications; the viewing of live and historical data from sensors; thereby generating live and historically validated food safety data with means to verify pathogen destruction and safety.

2 Claims, 9 Drawing Sheets

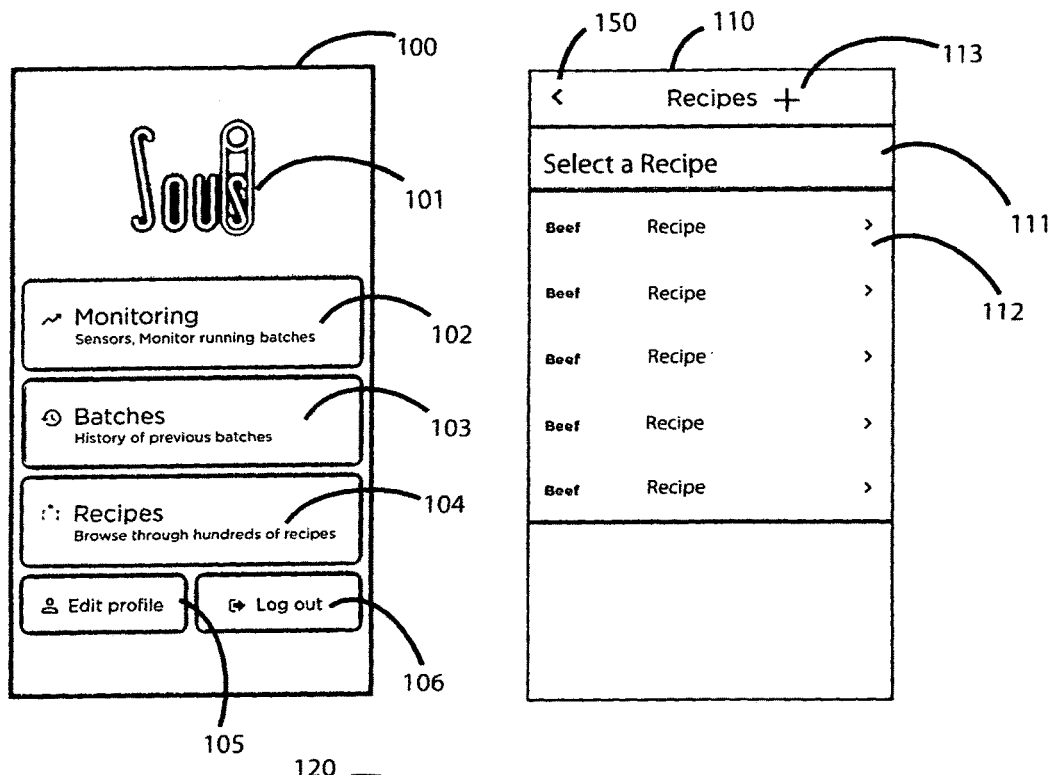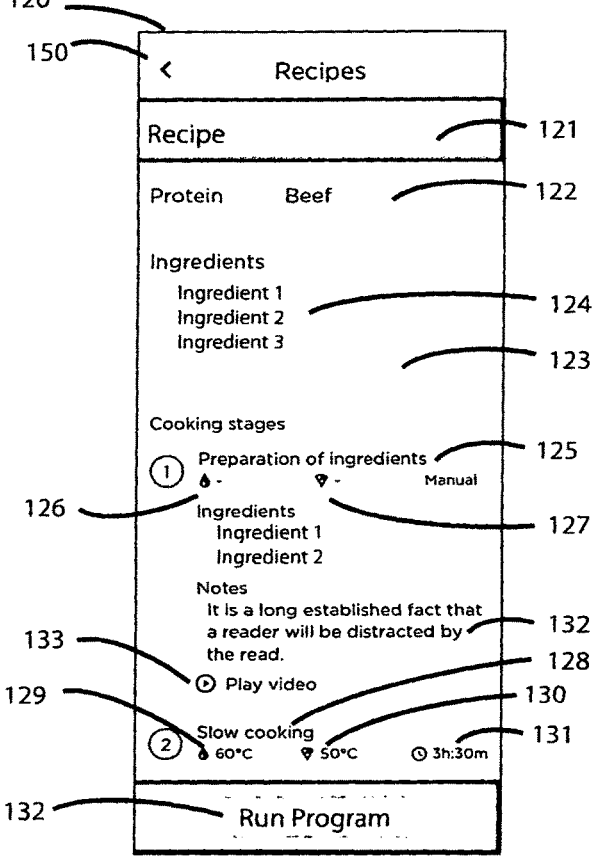
Fig. 1A

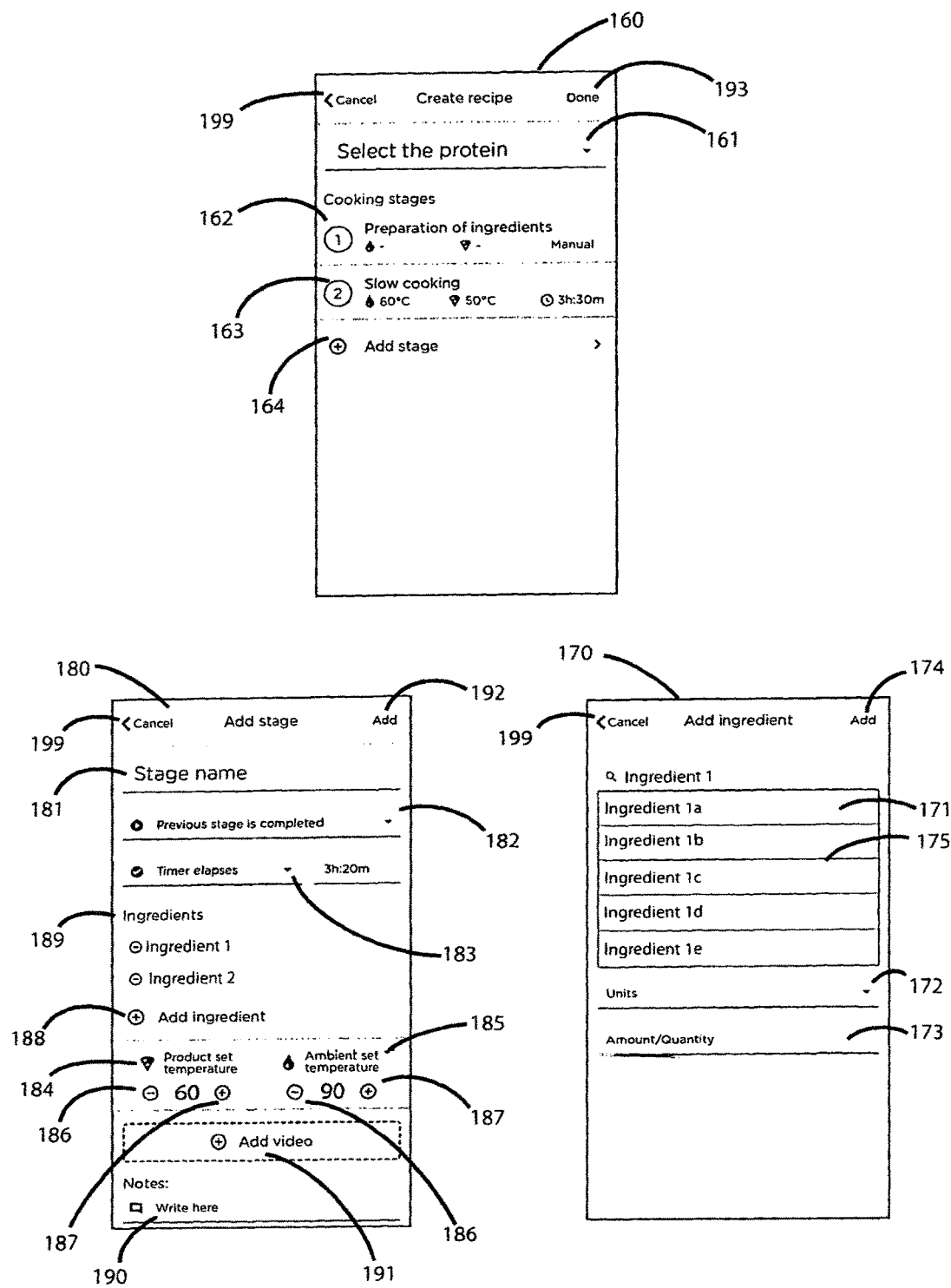

Fig. 2A
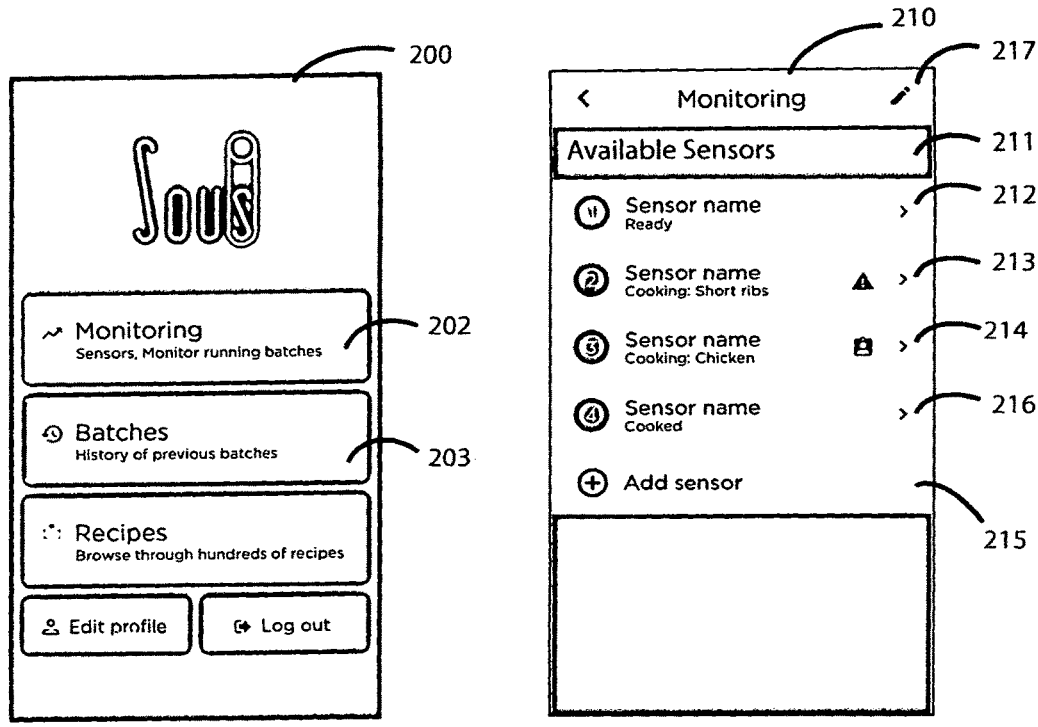
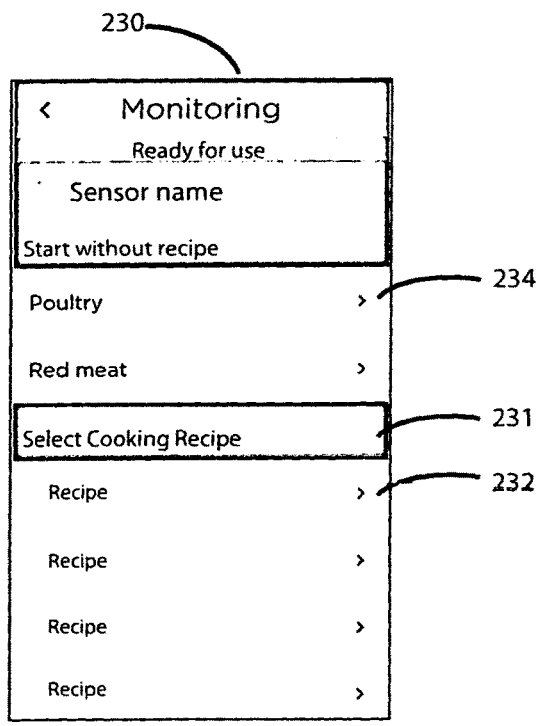

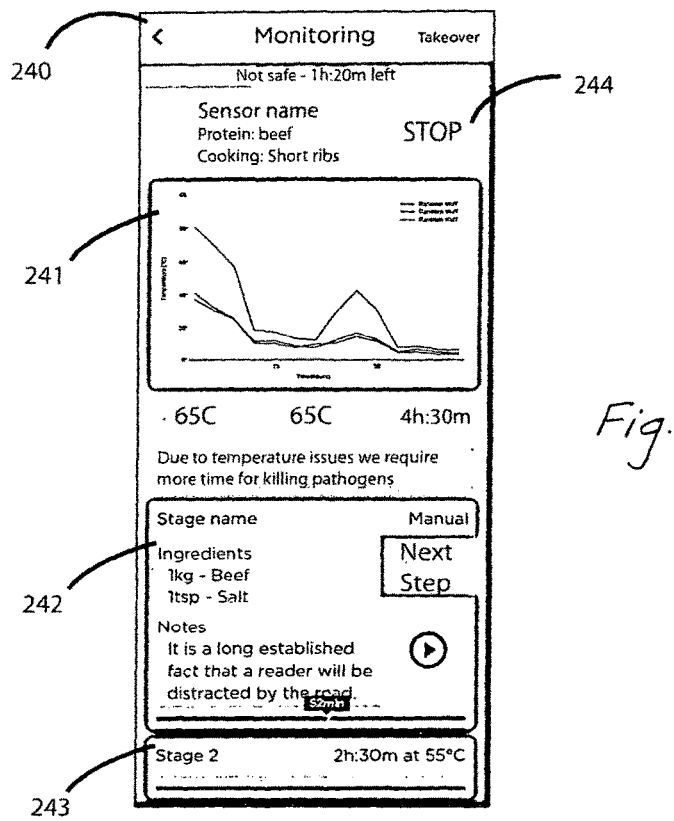
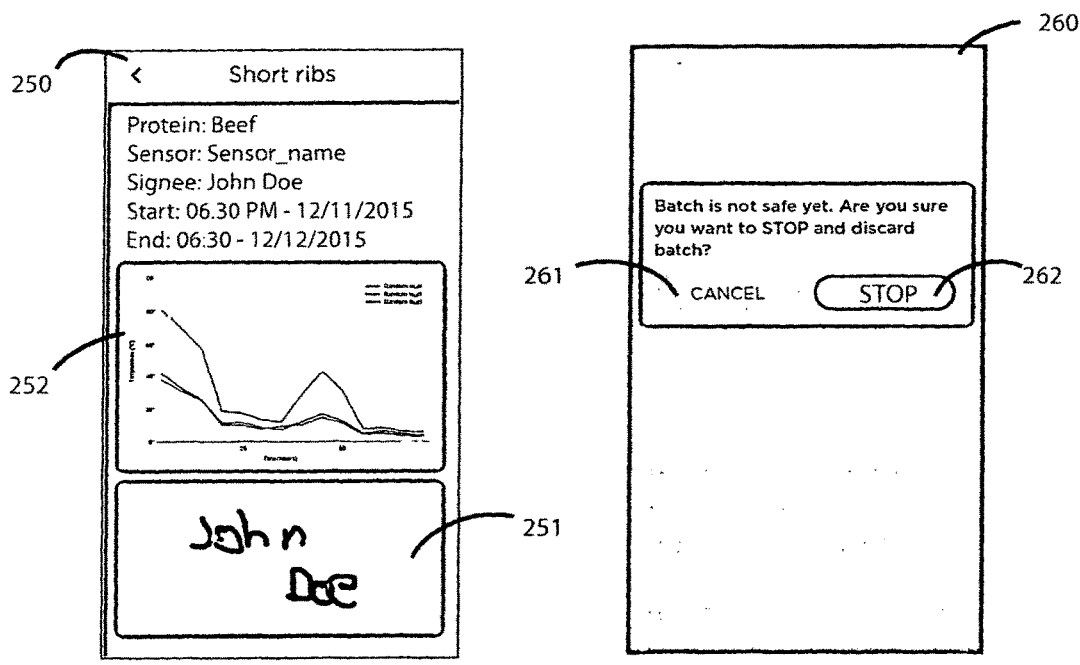
Fig. 2B

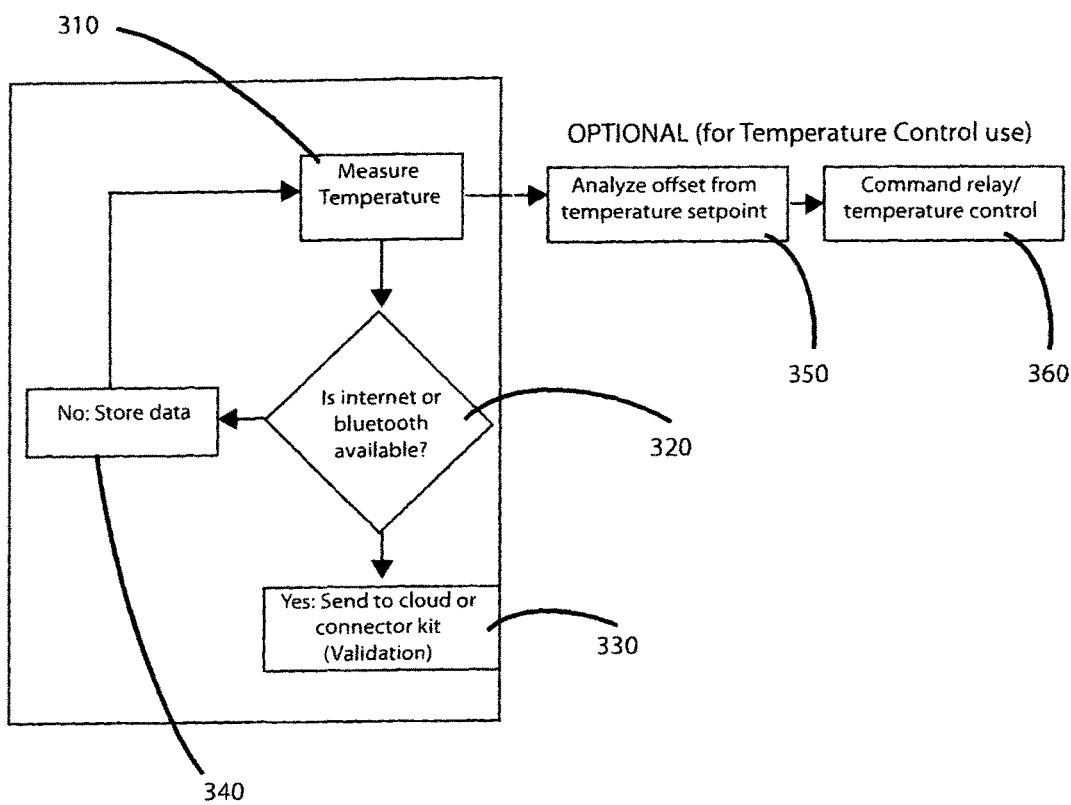

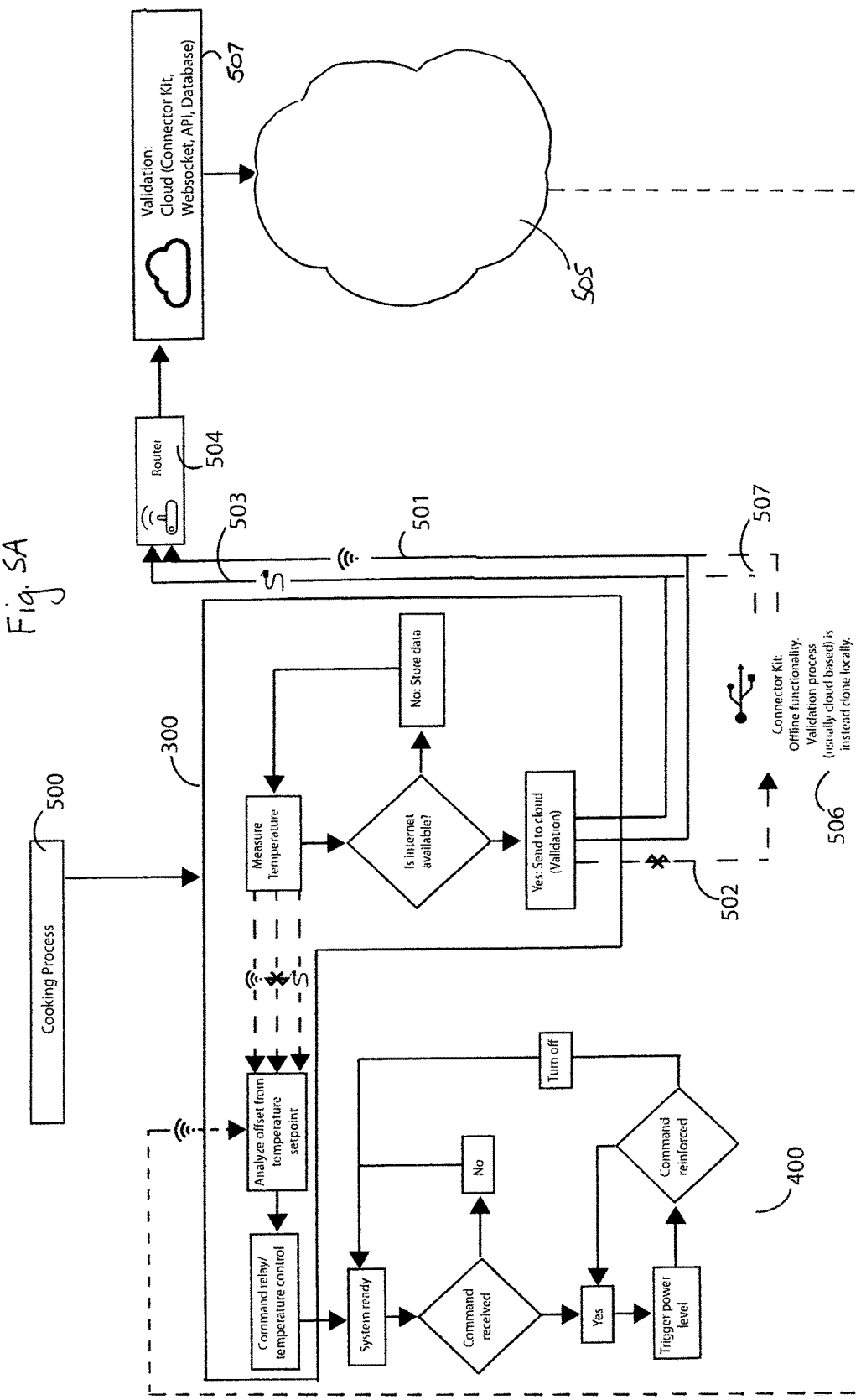

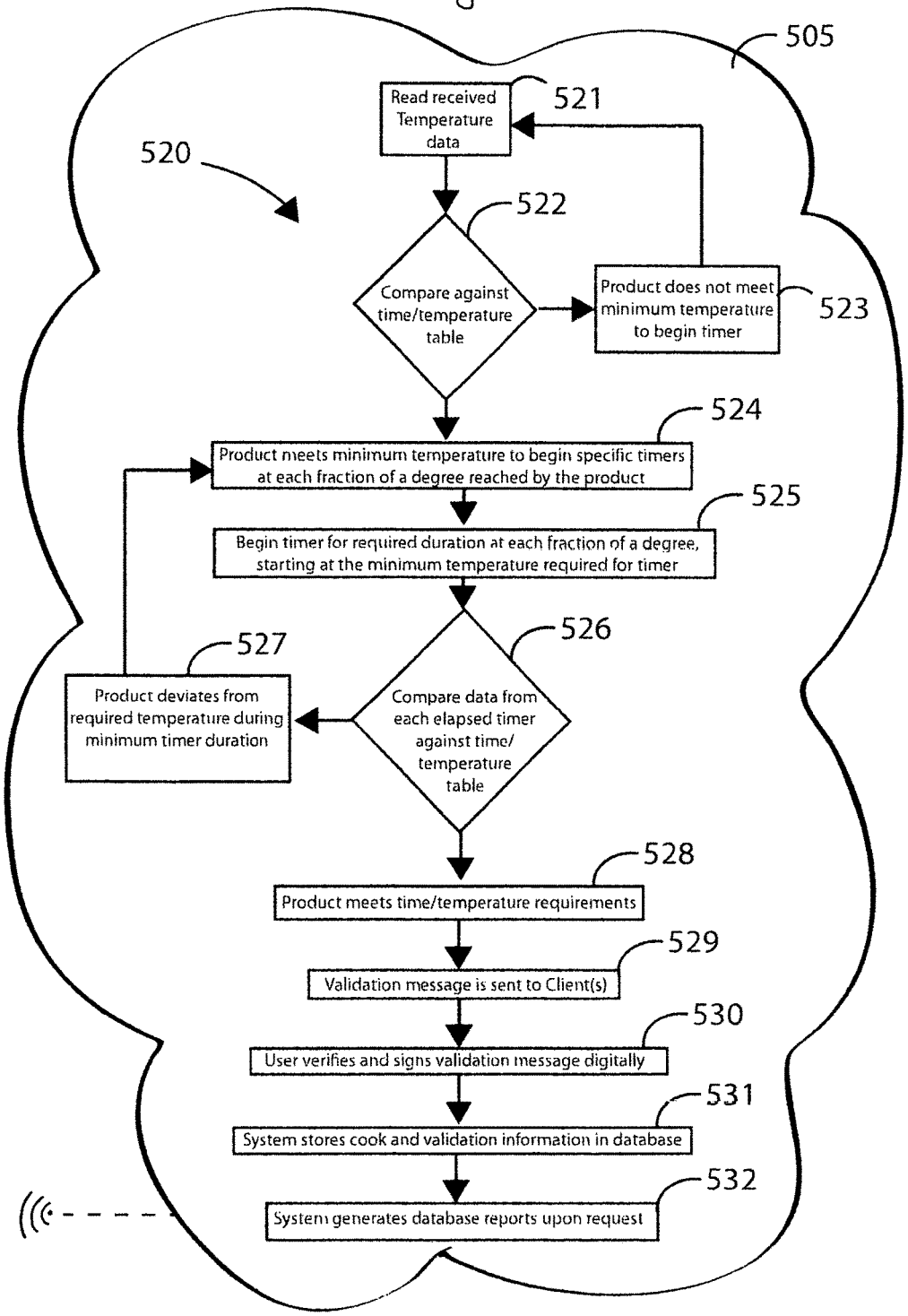

APPARATUS AND METHOD OF TEMPERATURE-PRECISE CULINARY PROCESSES INCLUDING FOOD SAFETY VERIFICATION

FIELD OF THE INVENTION

Applicant's invention relates generally to precision temperature culinary processes and more specifically to programmable control and automated food safety validation for verification of precision temperature processes, including but not limited to sous-vide control, safety monitoring, and safety validation.

The invention has particular application for commercial precision temperature processes with pre-set recipe programs to control temperature, monitor food safety in terms of pathogen destruction, holding temperature with validation and verification of said processes.

REFERENCE TO RELATED APPLICATIONS

This application is an original first filing; no provisional, continuation or other document has been filed with the United States Patent & Trademark Office by applicant pertaining to this subject matter.

ACKNOWLEDGMENT OF GOVERNMENT SUPPORT

This invention was not developed with any type of government support. The government has no rights in applicant's invention.

BACKGROUND OF THE INVENTION

Precision temperature processes involve specific temperatures that must be reached and held during cooking and chilling process. It is most frequently understood as cooking at temperatures that require an extended hold time of 1 minute or more to reach a full kill of potentially hazardous pathogens. As higher cooking temperatures are reached pathogens are reduced at a faster rate until an "instant kill" temperature is reached. When cooking at lower temperatures, in order to ensure pathogens are reduced to appropriate levels, minimum hold times must be maintained. The lower the cooking temperature, the longer the minimum hold time. This time and temperature varies with the type of product cooked. This same principle applies to chilling processes, wherein there is a time and distinct temperature relationship that must be adhered to for safe food chilling.

Furthermore, industry often implements exceedingly long cook times, often in excess of 48 hours, in order to change the texture of food. Precision temperature cooking is increasingly popular, both commercially and domestically, and is often implemented via sous vide cooking, or sometimes via low temperature poaching with flavoured fat or broth. Used commercially, this culinary process currently involves manual control of cooking and chilling programs, manual food temperature monitoring with temperature loggers and probes tracking product and cooking/chilling medium temperatures and undertaking manual food safety validation. Operators must manually download and review data against time/temperature regulations set out by the local health authorities. This is time consuming and it requires expertise. Furthermore, as previously mentioned, and unrelated to safety, for culinary reasons low temperature cooking often requires different cooking temperatures in stages over an extended period of time, as well as it often involves different stages of allowable chilling temperatures over specific time periods. The temperature changes correlate to the internal temperature on the product being cooked and the desired final temperature. There is a wide range of set points and recipes used to achieve different results. The manual implementation of such processes requires great culinary and food safety expertise.

Because of the complexity of the safety validation and the difficulty of monitoring extended cook and chill times, it is advantageous to have a device that monitors internal product temperature, and validates automatically the safety of the food once the minimum hold time at a specific temperature is met. Due to the evolving understanding of the relationships between time and temperature for pathogen destruction it is advantageous to have the validation system controlled by a program that can receive instant updates. Because of the need for stage cooking and chilling based on temperature changes of the internal product temperature over an extended period of time, it is advantageous for a program to control the cooking and/or chilling device, rather than the user via manual methods.

Any discussion of the prior art throughout the specification should in no way be considered as an admission that such prior art is widely known or forms part of the common general knowledge in the field.

SUMMARY OF THE INVENTION

According to an aspect of the invention there is provided a method for time/temperature monitoring, data storage, safety validation, and a programmable control process for precision temperature cooking using a multitude of existing cooking devices. This method includes an Automatic Process Interface or "API" which authenticates client applications using a combination of user and password, RSA public key and/or a token obtained in a previous authentication. Using the same means, various connector kits (local or in the cloud) are also authenticated using the same means.

The API allows a connector kit (local or in the cloud) to send data regarding available sensors, available relays, historical temperature data, validation or verification signatures or sign-off data, generated by the RSA key. The API further allows the client applications to view available connectors and sensors, view real-time information such as sensor temperatures, view historical temperature data, permit or enable "sign-offs" for specific batches, view previous signatures, and fetch public keys of the available connectors.

A "websocket" is used for real-time communication between connectors and client applications but also communicates with the API as well for various functions such as authentication of the connector or the client application, online notification and commands or verifications. The websocket mainly acts as a proxy between the connector and the client app but is not solely limited to that function.

Client Applications may provide input from a web based platform or website, a mobile desktop application to which a user logs into an established account for communication with the API. A websocket server may also be employed to perform the aforementioned actions and in addition is capable of communicating directly with the connectors if the network is setup to allow tcp/ip connections in absence of an internet connection and may therefore perform actions like viewing available historical data, viewing available sensors and relays, permitting the verification or signing-off of specific batches, starting and/or stopping a batch in accordance with a specific recipe.

"Connector kits" (local or in the cloud) authenticate against the cloud API and connect to the websocket in order to advertise its presence online and send live information if requested. They further send information to the cloud API in order to save and store said information in a database. The information includes but is not limited to historical data, signatures, but may include verification/sign-off data performed on the client application while in communication with the connector kit (local or in the cloud).

Connector kits (local or in the cloud) further authenticate client applications connecting directly thereto by using the RSA keys that the client application previously gathered from the cloud API and allowing client applications to read historical data, control available sensors and relays, sign-off batched processes and view live and real-time information.

Integral to the control, monitoring and reporting of temperature by the connector kit (local or in the cloud) are sensors for monitoring and reporting the temperature to the connector kit (local or in the cloud) and relays which have the capability to control temperature in accordance with set or prescribed programs.

In summary the primary components can be described as comprising at least the following:

cloud subcomponents comprising the API for data storage, authentication, etc.;

a websocket for real-time communications;

client applications for viewing data, controlling and sign-off or validation;

a connector kit (local or in the cloud) for collecting sensor data, operating controlling relays and synchronizing data with the cloud;

sensors for monitoring and reporting temperatures to the connector kit (local or in the cloud); and relays for controlling temperature in accordance with set programs.

It is an object of the invention to overcome at least one of the disadvantages of the process and to facilitate sound food safety and sound culinary processes.

It is a further object of the invention in its preferred form to provide time and temperature monitoring and automatic food safety validation for existing cooking and/or chilling devices.

It is yet another object of the invention in its preferred form to automatically maintain food safety records for public health verification and local health authority review.

It is yet another object of the invention in its preferred form to provide an external control and user interface for existing cooking and/or chilling devices.

It is too an object of the invention to provide a process that can be applied to existing cooking/chilling devices and linked with the apparatus to become a complete precision temperature process control, monitoring and food safety validation system.

In the preferred embodiment of applicant's invention, external control, monitoring and food safety validation for precision temperature cooking and/or precision chilling employs relays to bypass and control electrical current to a cooking or chilling element.

Preferably, the method is used with existing sous vide cooking devices, existing precision cooking devices, existing immersion circulators, or existing hot water bath devices. In the preferred embodiment the method is useable with existing food warmer or food chiller devices.

In the preferred embodiment, the user signs on to an account using a client application, and selects a programmed recipe from the options "My Recipes", "Find Recipes" or "Create Recipes".

Once the user has created a new recipe, has found a recipe from the cloud database or alternatively downloads such a recipe from the web, proceeding through the steps to add the recipe to the existing cloud database, the user selects that recipe and runs the program whereby data transfers (communicates) via the websocket and gateway to the apparatus to begin control, monitoring and validation activities.

Throughout the program sequence, the system displays real time charts of time and temperature, providing automatic validation messages to the client application to indicate validation that food is safe. Further, the client application prompts the user to verify the food safety validation.

Additionally, the system sends user verified time and temperature data automatically to storage for food safety record keeping purposes once process is complete or whenever the user attempts to end a program.

When a user signs on to an account using a client application, and selects from "My Recipes" "Find Recipes" or "Create Recipes", programs/recipes are queried according to different search criteria based on popularity ratings, protein type, taste profile, specific user recipes, source and quality rating.

Running the program causes data to be sent through the apparatus to begin control, monitoring and validation activities. More preferably the user creates recipe by manually entering settings and saving data to create a new recipe. It is anticipated that any such recipe can be made available to an online community of device users. In such cases, the user can make recipes private or send invitations to specific users only.

In the preferred embodiment, the method is used as an external control, monitoring and food safety validation tool for precision temperature cooking and/or precision chilling. More preferably, the method is used as an external control, monitoring and food safety validation tool for existing precision temperature devices using the relay to bypass and control electrical current to cooking element.

More preferably the method is used with existing sous vide cooking devices, existing precision cooking devices, existing immersion circulators, or existing hot water bath devices. In the preferred embodiment the method is further useable with existing food warmers or food chiller devices.

Preferably, the system sends user verified time and temperature data automatically to storage for food safety record keeping purposes once process is complete and the system is capable of sending time and temperature recorded data to online storage whenever the user attempts to end a program.

In the preferred embodiment, in addition to the basic process control features described above, the user may add cooking stages to any recipe or in the process of defining or building a new recipe. The client application is furthermore capable in the case of new or existing recipes of adding or deleting ingredients, raising or lowering operational or recipe stage temperatures and hold times as well as notifications of product safety and compliance with recipe cooking stages.

BRIEF DESCRIPTION OF THE DRAWINGS

FIG. 1A is a process flow chart illustrating a typical "Create and Run Recipe" application command process on a standard client (smartphone in this case), illustrating options for creating and beginning the selection of a particular control choice of a culinary process;

FIG. 1B depicts a continuation of the process of FIG. 1A wherein a selection of the add recipe function of FIG. 1A yields a recipe submenu further described in FIG. 1B.

FIG. 2A is a process flow chart illustrating a typical "Monitoring and Validation" application command process using a standard client (smartphone in this case), illustrating options for monitoring parameters and the process for culinary process and validation completion;

FIG. 2B depicts the process summary submenu activated by the selection illustrated in FIG. 2A.

FIG. 3 is a process flow chart is a flow chart that illustrates a typical temperature-sensing process of temperature-sensing hardware, based on commands initiated by the client via FIGS. 1A, 1B, 2A and FIG. 2B;

FIG. 5A is a process flow chart illustrating a full system culinary process from initiation, to monitoring time and temperature, to controlling time and temperature, to validating time and temperature against food safety requirements, and further to storing process reports as searchable records;

FIG. 5B depicts in further detail the process flow of temperature validation in the cloud as illustrated in FIG. 5A.

DETAILED DESCRIPTION OF THE INVENTION

Figure 4:
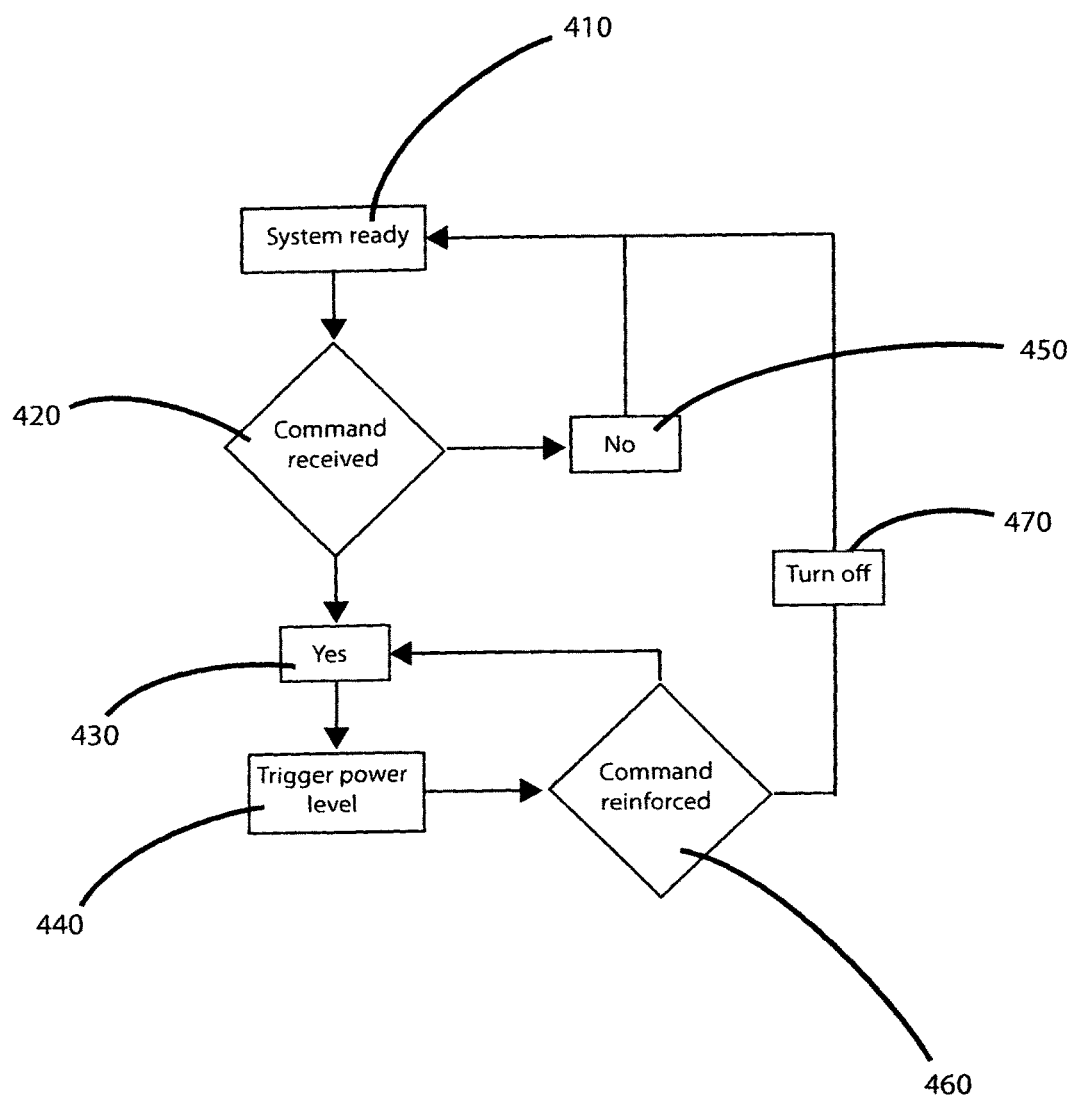
FIG. 4 is a process flow chart illustrating an optional temperature control process of relay or control hardware, based on commands initiated by the client via FIG. 1 and FIG. 2, and based on information received via FIG. 3.

FIGS. 1A and 1B depict the client application main or home page 100 including a non-operational name or logo and three culinary related operating options: monitoring option 102; batches option 103; and recipes option 104. Further provided on main page 100 are two application functions: edit profile 105, which allows access to an edit page (not shown) for adding profile information of various characteristics; and log out 106 which operates to exit the client application.

Selecting recipes option 104 results in the display of recipes submenu 110. Recipes submenu 110 provides two primary options, protein option 111 which displays a recipe list 112, or recipe add option 113, which displays features and options depicted in FIG. 1B.

If a recipe from recipe list 112 is selected, recipes submenu 120 is displayed. Recipes submenu 120 displays recipe name 121, protein selection 122, recipe detail summary 123 containing ingredient list 124, manual preparation function 125, where immersion liquid temperature selection 126 and protein temperature selection 127 may be set for manual operation. Alternatively, slow cooking function 128 may be selected displaying preset immersion liquid temperature 129, preset protein temperature 130 and preset run time 131. Other information displayed on submenu 120 are textual notes 132 with useful information about recipe 121 and play video function 133 which allows the user to access additional relevant information from a cloud-based database (not shown). Absent choosing to manually set the process using manual preparation function 125, the preset slow cooking function 130 will run by the user selecting application function run program 132. This function is further described in FIG. 2. Also provided in submenu 120 is a common go back function 150 also provided in recipes submenu 110.

As stated above, by selecting add recipe function 118 in submenu 110 of FIG. 1A, create recipe submenu 160 is displayed. Create recipe submenu 160 contains several selection options including protein selection 161 prompting a drop down text entry field (not shown), preparation of ingredients option 162, a slow cooking option 163 and an add stage function 164. Slow cooking function 163 allows the selection of immersion liquid temperature, protein temperature and run time for the recipe being created as described in FIG. 1A. By selecting preparation of ingredients option 162, add ingredient submenu 170 is displayed. Ingredient 1 is displayed with capacity to add at least one ingredient. An ingredient 171 may be entered using a keyboard (not shown) and dropdown menu units of measurement 172 are selected appropriate to ingredient 171. Furthermore, the amount or quantity of ingredient 171 may be selected via entry 173. Once the entry of units of measurement 172 and amount 173 are selected, the add function 174 may be selected adding said ingredient to ingredient list 175, said list populated by the addition of other ingredients in addition to ingredient 171. Such information pertaining to ingredients, units of measurement including volume, units, weight, etc. common to the culinary art are contained in a cloud based data storage (not shown).

Referring back to created recipe submenu 160, the selection of add stage function 164 results in add stage submenu 180 which allows the client user to divide the recipe/culinary process into a series of recipe or cooking stages.

By selecting stage name 181, the user may enter a name via a pop up keyboard by entering text or stating names verbally via a microphone option on the keyboard (not shown). The user may also select prompt 182 to select the prompt to begin this stage upon previous stage completion or alternatively, by selecting prompt 183 when a timer elapses. Prompt 182 further allows the user to add a time to the stage (time addition function not shown) which dictates the length of time the stage will persist. Temperature option 184 allows the user to dictate the temperature required for the product or protein and likewise for the cooking or chilling medium; e.g. a water bath or other immersion liquid required for this stage. Temperature option 185 allows the user to dictate the corresponding temperature, in each of the temperature options, via decrease buttons 186 and 186' or via increase buttons 187 and 187'.

Add stage submenu 180 further provides add ingredient option 188 which allows ingredients to be added to the stage via a submenu similar in function to ingredient submenu 170, but which, when complete, reverts to add stage submenu 180, populating its own ingredient list 189. Selecting notes option 190 allows the client user to add notes and explanations to the stage, and option 191 allows the client user to upload a video related to the stage. When the stage is complete, the user selects add function 192 which returns the client application to the previous create recipe submenu 160, wherefrom the selection of the done option 193 indicates that the new recipe/culinary process is complete, is added to the recipe database and the application returns to the home menu of FIG. 1A wherein the new recipe can be selected and run. In each case, submenus 160, 170 and 180 each are provided with operating functions 199, 199' and 199" which serve to cancel the submenu operation.

Referring now to FIG. 2A, home page menu 200 provides the options of selecting monitoring option 202 and batches option 203 which enables a report viewing process flow as later described in FIG. 6.

Monitoring of precision temperature related culinary processes can be initiated also by selecting run program 132 from FIG. 1A. Each of these selections result in a display of monitoring submenu 210. Among the features of this submenu, available sensor display 211 in FIG. 2A features a plurality of sensors being monitored. The amount of sensors is dependent upon the number of sensors configured in the overall system communicating with the hardware, circuitry and programmable logic in communication with the cloud (all not shown in this particular figure); the hardware for such described in FIG. 3. For example, in FIG. 2A, the available sensors include ready sensor 212 capable of reading data from a recipe if selected, sensor 213 reading data from a first specific recipe, sensor 214 reading data from a second specific recipe and an add sensor function 215 to allow the user to add a sensor to the available sensor list. Among the available sensors in this figure is which can be selected for monitoring are sensors such as operating sensor 216 having completed the cooking cycle. Further provided in monitoring submenu 210 is selection 217, allowing the user to edit the names of particular sensors displayed. Once a sensor is chosen for monitoring, said main monitor view screen 230 is displayed If monitoring submenu 210 is opened from home page 200 by selecting monitor option 202 and ready sensor 212 is subsequently selected, monitoring submenu 230 is displayed. Monitor submenu 230 displays a recipe list 231 having among the list select recipe option 232. Further displayed is at least one protein selection which may be selected for the culinary/cooking process without a specified recipe in this instance identified as protein option 234. Selecting protein option 234 allows the user to begin monitoring activities based on the regulatory food safety parameters for a specific type of protein, without any recipe/culinary process controls. Choosing select recipe option 232 allows the user to begin monitoring activities for a specific recipe/culinary process already saved in the recipe database. From the selection of either sensor name 213 or sensor name 214 or a recipe from recipe list 231, the client application commences temperature sensing and monitoring (described in FIG. 3) and opens monitoring main menu 240 as seen in FIG. 2b.

In the event operating sensor 216 is selected from monitor submenu 210, process summary submenu 250 is displayed as illustrated in FIG. 2b.

Referring further to FIG. 2b, monitor main menu 240 includes cooking chart subdisplay 241, recipe stage data subdisplay 242, stage monitor 243 and sensor stop function 244.

The monitor main menu 240 will remain displayed, unless sensor stop function 244 is selected, until the monitoring of the culinary and/or food safety process is complete and validation can be achieved, wherein process summary submenu 250 will pop up having both a with a validation field entry 251 and a culinary process chart 252, which must be signed by the user to indicate that validation is complete, following which the validated, signed record is communicated to the cloud database for storage. Alternatively, from monitor main menu 240, the user may select stop function 244 which terminates temperature sensing/monitoring and opens safety alert submenu 260, alerting the user before validation that the product being monitored may not be safe due to premature interruption of the cooking process. The user may choose monitor cancel option 261 from monitoring submenu 260 to cancel the stop function 244 or the user may choose stop confirmation option 262 from submenu 260 confirming the stop function 244 command, thereby agreeing to discard the unsafe product unless other data or circumstances indicate that the product is not compromised. If stop confirmation option 262 is selected, the monitoring program communicates a record of the action to the cloud database (not shown), identifying the product as potentially unsafe.

FIG. 3 illustrates temperature sensing and monitoring process 300, consistent with the process flow described in FIGS. 1A, 1B, 2A & 2B. In the preferred embodiment of applicant's invention, when the user commands the commencement of monitoring as shown in FIG. 2A and described above, the commensurate sensor is prompted to measure temperature via temperature measure control 310 at intervals of one temperature measurement per second. Connectivity sensing device 320 then determines if Wi-Fi or Bluetooth connectivity is available. If connectivity availability is confirmed, real time data from temperature sensing device 310 is communicated directly to the cloud for validation via communication device 330. If Bluetooth is available, but Wi-Fi is not, the temperature-sensing device sends time and temperature information real time as it is received to the local connector kit (not shown) for validation via communication device 330. If connectivity sensing device 320 determines that neither Wi-Fi or Bluetooth connectivity is available, the temperature data is stored in temperature-sensing device 340 and time and temperature information data continues to be monitored and stored in the temperature-sensing device 340 until Wi-Fi or Bluetooth connectivity becomes available. If an optional feature of temperature control has been introduced to the system, offset analyzer 350 and temperature relay/control 360 are operational. As temperature is measured at specific time intervals via temperature measure control 310, offset analyzer 350 compares the temperature against the required set-point specified in the selected recipe. Based on the differential between the actual temperature and the required set-point at the specific time interval, temperature relay control 360 engages the relay or temperature control detailed in FIG. 4.

FIG. 4 illustrates optional temperature control mechanism 400. If a temperature control mechanism is integrated into the system, a temperature relay, 410 readies the system when a user selects to monitor and control temperature as illustrated and described in FIGS. 1 and 2 dictating required set-points to offset analyzer 350 and temperature relay/control temperature 360 of FIG. 3, or when temperature monitoring device 420 simply receives time and temperature information from the temperature sensing and monitoring process 300 described in FIG. 3. "System ready" for each immersion type culinary device being operated by temperature control indicates that said device in on, said temperature control in on, said temperature control device in on, said temperature control mechanism is on and temperature monitoring devices are generating temperature data from the product to be monitored. Temperature monitor device 420 compares the potential set-point/real time temperature with the prescribed set point. If there is a differential, temperature gate 430 allows temperature relay 410 to trigger power level control 440 to adjust temperature of the immersion liquid (not shown) thus increasing or decreasing the product temperature based on the differential. If no differential is determined by temperature monitoring device 420, a signal is communicated to temperature control system monitor 450, which communicates to temperature relay 410 to maintain system readiness, continuing to receive temperature information and analyzing it against the required set-point. thus increasing or decreasing the product temperature based on the differential. This command from temperature monitoring device 420 is reinforced by temperature command control comparator 460 and the system continues to trigger the power level until the product temperature matches the desired set-point. When command control comparator 460 determines that the set-point temperature differential no longer exists, command temperature feedback device 470 feeds that information back to temperature relay 410 which returns to system ready state.

FIG. 5A illustrates the full process from initiating a culinary process, to monitoring times and temperatures, to controlling times and temperatures, to validating the times and temperatures against food safety requirements as well as storing process reports as searchable records. As described in FIGS. 1A, 1B, 2A and FIG. 2B, a recipe or culinary process may be chosen and/or monitoring may be engaged for a specific protein, represented in this figure by cooking process 500. Upon the user selecting process 500 monitoring/temperature-sensing process 300 begins to monitor temperature and in concert with temperature control mechanism 400 begins to adjust temperature in keeping with the temperature dictates of the various recipe stages of cooking process 500 interacting by one of three communications connections: Wi-Fi communications path 502, Bluetooth communications path 502 or direct wire communications path 503. When temperature-sensing system 300 can access Wi-Fi or is wired directly, monitoring data is sent to a router 504, which sends it to cloud 505 via connector kit 506 in USB or ethernet communication with router 504, where it undergoes the validation and record storage process 520 as more fully depicted in FIG. 5B. When temperature-sensing system 300 can access only Bluetooth, monitoring data is sent to connector kit 506 via communications path 502, where it undergoes an offline validation process and records are saved, which records are sent to the cloud for database storage when the connector kit gains access to Wi-Fi communications path 501 or via direct wiring communications path 503. A combination websocket and automatic process interface "API" 507 provides the interface with router 504 to access and process information in cloud 505. Cloud 505 is capable of storing ingredient lists and databases, photos, videos, recipes, monitoring data, validation data, cook times and temperature tables for different proteins, databases of protein types and user databases.

Monitoring/temperature-sensing process 300 described in FIG. 3, provides real-time time and temperature data to validation system 520 via router 504, websocket and API interface 507 using either Wi-Fi 501 or direct wire 503. Validation processing is performed in cloud 505 via the online connector kit 506 or websocket and API 507 when Wi-Fi is available. The validation process occurs in the local connector kit 506 when Wi-Fi is not available, but Bluetooth is available. Other than the method of receiving data, the validation process is the same whether it occurs in the cloud or the connector kit.

To begin the validation process, the system receives and reads the real-time monitoring in process step 521, more fully depicted in FIG. 5B. It compares this monitoring data against time-temperature tables established by the governing food safety authority in process step 522. Based on monitoring data received, if the product has not yet met the required temperature to begin a timer then the system continues to read and compare monitoring data in process step 523 until such a time that the required temperature is met to begin timing in process step 524. Once the system confirms that the product has met the required temperature to commence timing, the validation system turns on specific timers for each fraction of a degree as the product changes temperature in step 525. Once a timer has elapsed, the system compares the monitoring data for the duration of the timer against the legislative requirements for time-temperature in process step 526. If the monitoring data through the duration of a timer falls short of the recipe or stage requirements the timer is re-implemented in process step 527 for that specific temperature providing assurance that the product meets said requirements. As soon as any one of the timers elapses with product having maintained the required temperature for that time interval in process step 528, a validation message is sent to the client and validation screen 251 of FIG. 2 is displayed in process step 529, whereby the client user verifies and digitally signs the validation message as process step 530.

Following verification and digital signing, this recorded validation is stored in the record database in cloud 505 in process step 531. If verification occurs in connector kit 506, the record is stored there until Wi-Fi or LAN are available, at which point the record is sent to cloud 505. Any records stored in the database can be accessed as reports via the client app when requested and when Wi-Fi is available, as final validation process step 532.

Figure 6:
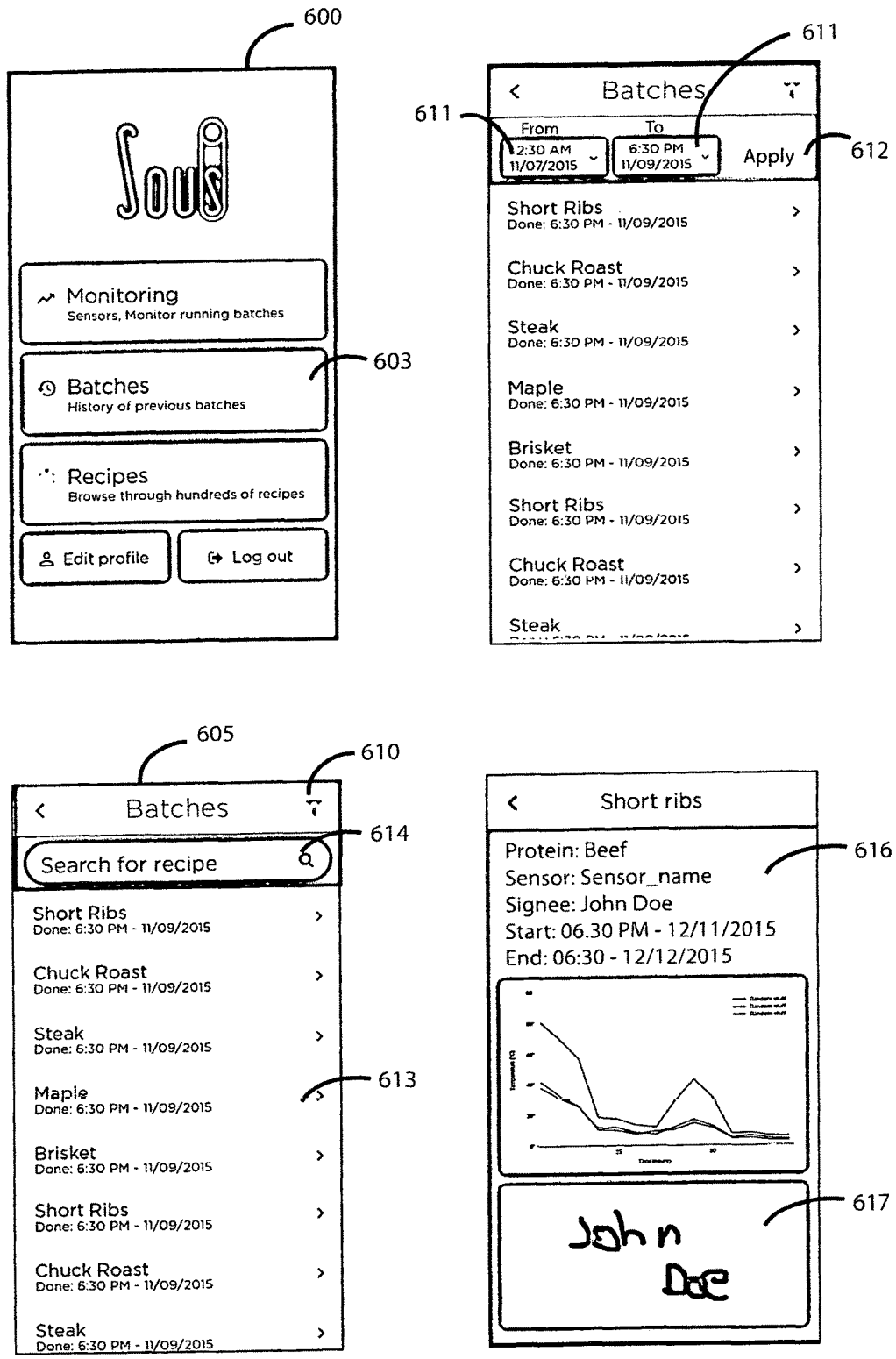
FIG. 6 is a process flow chart illustrating a typical database record process, wherein client commands operate to view records stored in the cloud database.

FIG. 6 details the process of searching and viewing monitoring and validation messages from the database via the client app. From home menu 600, when batches function 603 is selected, batch submenu 605 is displayed. Iconic function 610 allows the user the option to filter records according to date or recipe. If the fields user chooses to filter by date, batch submenu 606 is displayed and the user must indicate the date parameters for the search entering information in from date field 611 and to date field 611'. Once entered, the user presses apply function button 612. The client user can then choose from recipe records that are listed within that date span displayed in date search list 613. If the user, instead of opting to search by date, instead chooses to filter by recipe name, the user must enter that information in recipe name field 614. The client user can then choose from the recipes shown in recipe search list 615 associated with that search. Once a record is selected by selecting either date search list 613 or recipe search list 615, the associated validation record 616 is displayed evidencing the validation sign off 617 if validation was indeed executed.

What is claimed is:

1. A system for providing verification of food preparation in a precision culinary device in accordance with established food safety regulations and procedures comprising:
   a connector kit; said connector kit capable of transmitting or storing time and temperature data;
   a websocket;
   a cloud-based database; said cloud-based database capable of storing recipes and food safety cooking requirements, said cloud-based database further capable of storing, reporting and archiving time and temperature data;
   a client application platform such as a computer or smart mobile device;
   at least one application, said application compatible with and installed on said platform; said application thereby in communication with said connector kit;
   an automatic process interface in communication with said websocket, said cloud based database, said connector kit and said client application;
   at least one recipe stored in said cloud-based database, said recipe specifying ingredients such as proteins and other culinary products, said recipe further defining at least one cooking stage specifying temperature setpoints and times for said ingredients to be elevated to or decreased from in said culinary device in accordance with standardized food safety regulations;

at least one temperature monitoring device in communication with said connector kit;

at least one temperature sensor said sensor capable of communication with said ingredients, said temperature sensor in communication with said temperature monitoring device;

at least one timing device in communication with said temperature monitoring device;

a validation process provided in said client application, said validation process in communication with said connector kit such that culinary device temperature and time information is monitored by the client application for comparison with said recipe specifications and defined cooking stage time and temperature requirements for pathogen control, said client application further providing that when said comparison confirms that standardized food safety regulations are met, said client application sends a validation message to the operator for verification and certification, said client application further archiving the relevant time and temperature data to support said certification that said recipe specifications and food safety regulations have been met.

2. The system of claim 1 further comprising:

a temperature control device capable of operating said culinary device, said temperature control device in communication with said connector kit;

said temperature monitoring device further comprising an offset analyzer, said offset analyzer capable of analyzing a temperature offset between the temperature of said ingredient in comparison with said temperature setpoints in said recipe;

at least one command relay and control device in communication with said connector kit, said command relay and control device in also in communication with said offset analyzer and said temperature control device such that when said offset analyzer detects an offset between the temperature setpoint of said recipe and the temperature of said ingredient, said command relay communicates an instruction to said temperature control device to increase or decrease operating temperature of said culinary device to achieve said recipe setpoint.

* * * * *